(12) United States Patent
Niemela

(10) Patent No.: US 9,185,571 B2
(45) Date of Patent: Nov. 10, 2015

(54) EMPLOYING REFERENCE SIGNALS IN COMMUNICATIONS

(75) Inventor: Kari Juhani Niemela, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 13/700,292

(22) PCT Filed: May 28, 2010

(86) PCT No.: PCT/EP2010/057430
§ 371 (c)(1),
(2), (4) Date: Apr. 9, 2013

(87) PCT Pub. No.: WO2011/147463
PCT Pub. Date: Dec. 1, 2011

(65) Prior Publication Data
US 2013/0201913 A1    Aug. 8, 2013

(51) Int. Cl.
*H04L 25/03* (2006.01)
*H04W 24/00* (2009.01)
(Continued)

(52) U.S. Cl.
CPC ............... *H04W 24/00* (2013.01); *H04B 3/238* (2013.01); *H04B 7/0684* (2013.01);
(Continued)

(58) Field of Classification Search
CPC . H04L 27/2613; H04L 5/0048; H04L 5/0023; H04L 25/0226; H04L 27/2675; H04L 27/2662; H04L 5/0032; H04L 25/0204; H04L 7/041; H04L 7/042; H04L 2027/0089; H04L 7/008; H04L 27/261; H04L 25/03178; H04L 25/03292; H04W 64/00; H04W 24/00; H04W 28/04; H04B 1/707; H04B 1/7117; H04B 7/0452; H04B 7/0684; H04B 3/238; H04J 11/0023

USPC ......... 370/208, 299, 328, 329, 335, 342, 441, 370/210, 280; 375/267, 299, 130, 142; 455/226.1, 423, 424, 446
See application file for complete search history.

(56) References Cited

U.S. PATENT DOCUMENTS 5,488,629 A * 1/1996 Takahashi et al. ............ 375/150
7,830,949 B2 * 11/2010 Mehrnia et al. ............... 375/142
(Continued)

FOREIGN PATENT DOCUMENTS

| EP | 2 101 419 A1 | 9/2009 |
|---|---|---|
| EP | 2 157 752 A2 | 2/2010 |
| WO | WO 2004/059877 A1 | 7/2004 |

OTHER PUBLICATIONS

R1-070367, 3GPP TSG RAN WG1 meeting #47bis, Sorrento, Italy, Jan. 15-19, 2007, "Sequence Allocation Method for E-UTRA Uplink Reference Signal", Huawei, 3 pgs.

(Continued)

*Primary Examiner* — Edan Orgad
*Assistant Examiner* — Ivan O Latorre
(74) *Attorney, Agent, or Firm* — Harrington & Smith

(57) ABSTRACT

A method, an apparatus, a computer program product, and other embodiments are provided, which involve receiving a signal on a communications channel, correlating the received signal and a reference signal, and determining, on the basis of a result of the correlation, whether the reference signal can be employed on the communications channel. Additional aspects may provide improvements so that a simultaneous use of reference signals on the same communications channel may be detected. Further aspects may enable the performance of channel estimations on the basis of reference signals to be kept high even in networks where the distance between neighboring base stations employing the same reference signal is short and/or if the number of available reference signals is limited.

15 Claims, 4 Drawing Sheets

(51) Int. Cl.
   *H04B 7/06* (2006.01)
   *H04B 3/23* (2006.01)
   *H04L 25/02* (2006.01)
   H04L 27/26 (2006.01)
   H04L 5/00 (2006.01)

(52) U.S. Cl.
   CPC ..... *H04L 25/0226* (2013.01); *H04L 25/03178* (2013.01); *H04L 25/03292* (2013.01); *H04L 5/0048* (2013.01); *H04L 27/261* (2013.01)

(56) References Cited

U.S. PATENT DOCUMENTS

| | | | | |
|---|---|---|---|---|
| 2003/0026223 | A1* | 2/2003 | Eriksson et al. | 370/335 |
| 2003/0054813 | A1* | 3/2003 | Riley et al. | 455/424 |
| 2006/0083332 | A1* | 4/2006 | Dolmans et al. | 375/299 |
| 2006/0153322 | A1* | 7/2006 | Varikat et al. | 375/354 |
| 2007/0248113 | A1* | 10/2007 | Ko et al. | 370/436 |
| 2008/0274727 | A1* | 11/2008 | Axnas et al. | 455/423 |
| 2009/0129259 | A1* | 5/2009 | Malladi et al. | 370/210 |
| 2009/0252260 | A1* | 10/2009 | Noh et al. | 375/343 |
| 2010/0040166 | A1* | 2/2010 | Xin et al. | 375/267 |

OTHER PUBLICATIONS

3GPP TS 36.211 V9.0.0 (Dec. 2009), "3$^{rd}$ Generation Partnership Project; Technical Specification Group Radio Access Network; Evolved Universal Terrestrial Radio Access (E-UTRA); Physical Channels and Modulation (Release 9)", 85 pgs.

3GPP TS 45.002 V9.2.0 (Nov. 2009), "3$^{rd}$ Generation Partnership Project; Technical Specification Group GSM/EDGE Radio Access Network; Multiplexing and multiple access on the radio path (Release 9)", 108 pgs.

* cited by examiner

EMPLOYING REFERENCE SIGNALS IN COMMUNICATIONS

FIELD

The exemplary and non-limiting embodiments of this invention relate generally to reference signals in wireless communications networks.

BACKGROUND

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

In wireless communications systems, for example Global System for Mobile Communications (GSM), a signal transmitted from User Equipment (UE) to a Base Station (BS) may propagate via multiple paths. Each of the paths may be characterized for example by an attenuation and a delay that are introduced in to the transmitted signal.

In order to have an estimate of a radio channel, the UE may transmit to the BS a training sequence that is known to the BS. The radio channel between the UE and the BS may be estimated by analysing distortions caused by the radio channel to the training sequence. The channel estimation quality may be degraded for example when simultaneous transmissions during the transmission time slot of the training sequence. The degradation caused by the simultaneous transmissions occur to the training sequence may be difficult to compensate for. The simultaneously transmitted training sequences may combine constructively or destructively at the BS so that the BS cannot estimate the effects of the radio channel on the training sequence transmitted by a single UE.

Accordingly, two or more UE transmitting simultaneously using the same training sequence in the same time slot and frequency may cause severe degradation in performance of channel estimations.

Simultaneous transmissions employing the same training sequence may be particularly problematic when the transmissions overlap completely. This may happen in a synchronized network, e.g. a GSM network, where two or more UE transmit a burst simultaneously. When a transmission of a training sequence is distorted by an overlapping simultaneous transmission of the same training sequence, the cause of distortion may be difficult to detect at the receiver, e.g. the UE or the BS.

A frequency re-use factor in a communications network may define a distance between BSs that use the same frequency band. With a tight re-use factor, e.g. 1/1, neighbouring BSs may operate on the same frequency band. Consequently, received training sequences in a BS may be significantly distorted by transmissions from a neighbouring BS using the same frequency band. This distortion may be even more significant in a synchronized network, where transmissions of the same training sequence may overlap completely.

In a GSM network simultaneous transmissions of the same training sequence may be prevented by employing different training sequences in BSs. However, the number of available training sequences is limited, for example in GSM there may be only eight different training sequences available. Therefore, the eight training sequences are reused between the BSs in the GSM network.

The development in 3GPP GERAN, aiming at improved utilization of radio resources, has resulted in the development of orthogonal sub-channels under a VAMOS work item. This multiplexing method is defined in 3GPP TS 45.002 V9.2.0 (2009-11) 3rd Generation Partnership Project; Technical Specification Group GSM/EDGE Radio Access Network; Multiplexing and multiple access on the radio path; General description (Release 9). VAMOS allows multiplexing of transmissions of two users simultaneously on the same radio resource in orthogonal sub-channels. Transmissions of two users in the same radio resource in orthogonal sub-channels need a pair of different training sequences. Consequently, in a VAMOS sub-channel pair, the number of training sequences used by one radio channel is doubled. When VAMOS is applied with the existing training sequences to non-VAMOS handsets, the re-use of eight possible training sequences is more frequent. This reduces the distance between neighbouring base stations that employ the same training sequences. Consequently, the possibility of simultaneous transmissions of the same training sequence in the same time slot and frequency increases.

The number of reference signals may be limited also in other radio network technologies. In Long Term Evolution (LTE) developed by 3rd Generation Partnership Project (3GPP), enhanced Node-Bs (eNBs) may operate using the same frequency with limited number of reference signals. The number of so called Zadoff-Chu root sequences in the LTE uplink may be limited to 30 sequence groups, which can be circularly extended in a frequency domain to obtain a larger number of sequences. The use of Multi-User Multiple-Input and Multiple-Output (MIMO) technology will also multiply the need for reference signals at the same time in the same eNB. The number of pilot signals may be mostly constrained, when the narrowest bandwidth option (1.4 MHz) is linked with a high number of antenna ports. Consequently, the distance between neighbouring eNBs employing the same reference signal may be small also in LTE, and reference signals may cause interference to neighbouring eNBs.

Requirements set for training sequences used in communications systems may include for example Constant Amplitude and Zero Autocorrelation (CAZAC), which reduces the number of possible training sequences that can be used in communications systems. Accordingly, increasing the number of available training sequences in the networks may be difficult.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Various embodiments comprise method(s), apparatus(es), a computer program product, a computer readable medium, an article of manufacture, and a system as defined in the independent claims. Further embodiments are disclosed in the dependent claims.

According to an aspect, there is provided a method comprising receiving a signal on a communications channel, correlating the received signal with a first reference signal and determining, on the basis of a result of the correlation, whether the first reference signal can be employed on the communications channel.

According to another aspect, there is provided an apparatus comprising a receiver configured to receive a signal on a communications channel, a correlator configured to correlate the received signal with a first reference signal, and a processor configured to determine, on the basis of a result of the correlation, whether the first reference signal can be employed on the communications channel. According to another aspect, there is provided an apparatus comprising receiving means configured to receive a signal on a communications channel, correlating means configured to correlate the received signal with a first reference signal, and processing means configured to determine, on the basis of a result of the correlation, whether the reference signal can be employed on the communications channel.

According to another aspect, there is provided a system comprising an apparatus according to one or more aspects. According to another aspect, there is provided a computer program comprising program code means adapted to perform any of the steps or a method according to an aspect when the program is run on a computer.

According to another aspect, there is provided a computer readable medium comprising computer readable code for executing a computer process according to an aspect.

According to another aspect, there is provided a computer program product, comprising a computer usable medium having a computer readable program code embodied therein, said computer readable program code being adapted to be executed to implement a method according to an aspect. According to another aspect, there is provided an article of manufacture comprising a computer readable medium and embodying thereon program instructions executable by a computer operably coupled to a memory, which, when executed by the computer, carry out the functions according to an aspect.

Some aspects may provide an improvement so that a simultaneous use of reference signals on the same communications channel may be detected. Some aspects may enable the performance of channel estimations on the basis of reference signals to be kept high even in networks where the distance between neighboring base stations employing the same reference signal is short and/or if the number of available reference signals is limited.

Although various aspects, embodiments and features are recited independently, it should be appreciated that all combinations of the various aspects, embodiments and features are possible and within the scope of the present invention as claimed.

BRIEF DESCRIPTION OF THE DRAWINGS

In the following, the invention will be described in greater detail by means of preferred embodiments with reference to the accompanying drawings, in which.

DETAILED DESCRIPTION OF SOME EMBODIMENTS

Figure 1:
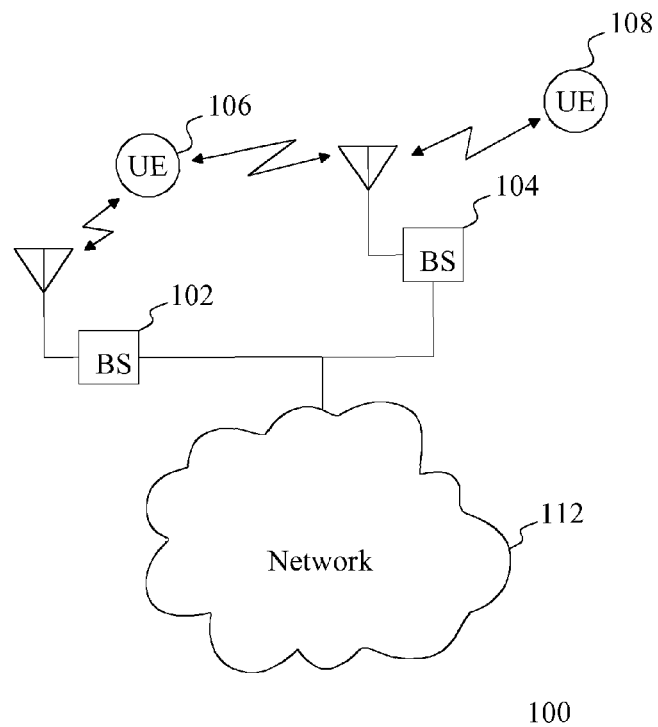
FIG. 1 illustrates a communications network according an exemplary embodiment.

Hereinafter, exemplary embodiments are described in greater detail with reference to the accompanying drawings, in which some, but not all, embodiments are shown. Indeed, the invention may be embodied in many different forms and should not be construed as limited to the embodiments set forth herein; rather, these embodiments are provided to enable this disclosure to satisfy applicable legal requirements. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Like reference numerals refer to like elements throughout.

The present invention is applicable to any UE, user terminal, server, corresponding component, and/or to any communications system or any combination of different communications systems that employ reference signals in communications. The communications system may be a fixed communications system or a wireless communications system or a communications system utilizing both fixed networks and wireless networks. The protocols used, the specifications of communications systems, servers and user terminals, UE, especially in wireless communications, develop rapidly. Such development may require extra changes to an embodiment. Therefore, all words and expressions should be interpreted broadly, and they are intended to illustrate, not to restrict, the embodiment.

In the following description of exemplary embodiments, a result of correlating a received signal with a reference signal has been used to determine a level of correspondence between the received signal and the reference signal. It should be appreciated that also other means of determining the level of correspondence may be used within the scope of the exemplary embodiments.

In the following description of exemplary embodiments, a signal received in a receiver from a communications channel may comprise one or more transmissions to be received, one or more interfering transmissions, and background noise. Accordingly, in the receiver the received signal from a communications channel may be expressed as:

$$R=S+I+N \qquad (1),$$

where R denotes the received signal, S denotes a transmission on the communications channel to be received in the receiver, I denotes an interfering transmission on the communications channel, and N denotes noise. Accordingly, in one example the received signal R may comprise a transmission that is interference on the communications channel, a transmission to be received in the receiver, or both. It should be appreciated that the one or more transmissions in the received signal may comprise only part of a transmission or transmissions. In another example, the received signal may only comprise noise N. This may be the case when the receiver is a BS deployed in an area, where no previous networks nor transmissions exist on the communications channel. When a BS is deployed in an area having one or more neighbouring BSs, the transmissions of the neighbouring BSs may be considered to be interfering transmissions I in the received signal R in the BS that is deployed.

A general architecture of a communications system 100 according to an exemplary embodiment is illustrated in FIG. 1. FIG. 1 is a simplified system architecture only showing some elements and functional entities, all being logical units whose implementation may differ from what is shown. The connections shown in FIG. 1 are logical connections; the actual physical connections may be different. It is apparent to a person skilled in the art that the systems also comprise other functions and structures.

The exemplary communications system 100 provides wireless access to wireless nodes 106 and 108 via infrastructure nodes 102 and 104. The wireless node 106 communicates with the infrastructure node 102 and 104. The wireless node 108 communicates with the infrastructure node 104. Accordingly, a wireless node may communicate with one or more of the infrastructure nodes.

The infrastructure nodes may be connected to a network 112. The connection may be wired or wireless. The network 112 may be a further infrastructure node, a cluster of infrastructure nodes, a core network or the Internet, for example. Accordingly, the wireless nodes may access the network 112 via the infrastructure nodes 102 and 104.

The communications system 100 may conform to one or more communications standards or technologies including but not limited to: a TETRA (Terrestrial Trunked Radio), LTE (Long Term Evolution), GSM (Global System for Mobile Communications), WCDMA (Wideband Code Division Multiple Access), WLAN (Wireless Local Area Net-work), WiMAX (Worldwide Interoperability for Microwave Access) or Blue-tooth® standard, or any other suitable standard/nonstandard wireless communication means. Wired connections in the communication system 100 may be implemented for example by using Asynchronous Transfer mode (ATM), Ethernet, E1 or T1 lines.

In an exemplary embodiment, communications in a communications system, for example in the communications system 100 in FIG. 1, may include one or more transmissions from a transmitter to a receiver, such as from a wireless node to an infrastructure node, or vice versa. One or more frequencies or frequency bands may be used for a transmission. The frequencies may be radio frequencies, for example. A transmission may include a reference signal. Reference signals include but are not limited to: a pilot, a training sequence, a cell-specific reference signal, a synchronisation signal, a Multi-Media Broadcast over a Single Frequency Network (MBSFN) reference signal, a User Equipment (UE) specific reference signal, a positioning reference signal, a sounding reference signal, a demodulation reference signal. The reference signal may be used in the receiver for cell search, channel estimation, neighbour cell monitoring and/or for providing channel quality information, for example. The reference signal may be known to both the transmitter and the receiver.

In an exemplary embodiment, for example in the communications system 100 in FIG. 1, a transmission may be transmitted over a communications channel from a transmitter to a receiver. A communications channel may be a physical channel or a logical channel. A logical channel may use one or more physical channels or part of a physical channel. The physical channel may be a radio channel comprising one or more radio frequencies on a frequency band. The radio frequencies may be frequencies of a frequency hopping pattern, for example. In frequency hopping, a carrier frequency or a frequency band used in the communications may periodically change according to a predetermined hopping pattern. Examples of communications channels further include a time slot, a burst, a frequency, frequencies in a frequency hopping pattern, a symbol, an Orthogonal Frequency-Division Multiplexing (OFDM) symbol, a Single Carrier Frequency Division Multiple Access (SC-FDMA) symbol, a resource element, an antenna port, a sub-carrier, a channelization code, a sub-channel, or a combination of one or more of the previous. A communications channel between a transmitter and one or more receivers enables communications between the transmitter and the one or more receivers. A communications channel may provide a connection between a transmitter and a receiver. Thus, a receiver may receive a transmission on the communications channel and a transmitter may transmit on the communications channel.

Communications from an infrastructure node to a wireless node may be referred to as downlink communications, and communications from a wireless node to an infrastructure node may be referred to as uplink communications. Communications may be unidirectional, involving communications in one direction at a time, or bidirectional, involving simultaneous two-way and independent transmission in both directions. Transmissions in bidirectional communications may be interleaved in time, thus by using Time Division Duplex (TDD), where both ends of a bidirectional connection alternate between transmitting and receiving data. Transmissions in bidirectional communications may alternatively be separated in frequency by different frequencies used for transmissions in each direction, thus by using Frequency Division Duplex (FDD).

A wireless node 106,108 may include a portable computing device. Such computing devices include wireless mobile communication devices operating with or without a subscriber identification module (SIM), including, but not limited to, the following types of devices: a mobile phone, a smartphone, a personal digital assistant (PDA), a handset, mobile stations, a cell phone, a Wireless Local Area Network terminal, a wireless mesh point, a relay node and user equipment (UE).

The infrastructure nodes 102 and 104 may include a base station, an access point, a gateway, a NodeB, an enhanced NodeB (eNB), and a relay node.

The infrastructure nodes 106 and 108 may communicate using the same communications channel or the communications channels may be different. Accordingly, the frequency or the frequencies of the infrastructure nodes may be the same or they may be different. The communications between the wireless nodes and the infrastructure nodes may be arranged in time intervals and/or different frequencies.

In an embodiment, the communications system 100 may be a GSM communications system. In the context of GSM, the wireless nodes 106, 108 may be referred to as UE and the infrastructure nodes 102, 104 may be referred to as base stations (BSs). A communications channel between UE and a BS may include a time slot on a frequency band of the BS. One or more time slots may be allocated for a transmission between UE and a BS. Each BS may be allocated one or more frequency bands.

In the context of GSM, a transmission in a time slot may be a burst, such as a Normal Burst. A transmission may include a training sequence that is known to both the transmitter and the receiver of the burst. Multiple transmissions may simultaneously be included in a time slot. For example in VAMOS, transmissions of two UE may simultaneously use the same radio time slot and subchannel. Separation of the simultaneous transmissions may be provided by using a different training sequence for each simultaneous transmission. The transmissions of the UE may also be referred to as Orthogonal Sub-Channels (OSC) or Multi-User MIMO. The training sequences may be allocated from the same set of training sequences or from different sets of training sequences. Examples of the training sequences available to a Normal Burst are provided in the 3GPP TS 45.002 V9.2.0 (2009-11) Section 5.3.2 and Tables 5.3.2a and 5.3.2.b.

In an embodiment, the communications system 100 may be an LTE communications system. In the context of LTE, the wireless nodes may be referred to as UE and the infrastructure nodes may be referred to as enhanced Node Bs (eNBs). A communications channel between UE and eNB may include one or more resource elements. A resource element may be defined by a combination of a symbol and a sub-carrier. A transmission from UE to an eNB may use Single Carrier Frequency Division Multiple Access (SC-FDMA), and a transmission from an eNB to UE may use Orthogonal Frequency Divisional Multiple Access (OFDMA). In the case of FDD, the frequency bands for uplink and downlink communications are different. Consequently, a sub-carrier used for transmissions in the uplink is at a different frequency and frequency band than a sub-carrier used for transmissions in the downlink. Accordingly, a resource element in the uplink may be defined by an SC-FDMA symbol and a sub-carrier for uplink, and a resource element in the downlink may be defined by an OFDMA symbol and a sub-carrier for downlink.

In an embodiment, a transmission between UE and an eNB may include a reference signal that is known to both the UE and the eNB. Examples of reference signals are provided for example in 3GPP TS 36.211 V9.0.0 (2009-12) Technical Specification 3rd Generation Partnership Project; Technical Specification Group Radio Access Network; Evolved Universal Terrestrial Radio Access (E-UTRA); Physical Channels and Modulation (Release 9), Sections 5.5 and 6.10.

In an embodiment, reference signals, e.g. downlink reference signals, may be generated from three orthogonal sequences multiplied by a pseudo random sequence summing up to 510 different combinations that can be used as unique cell identification codes.

Further examples of reference signals according to one or more exemplary embodiments include reference signals used in the uplink communications in LTE. These reference signals may comprise two types of uplink reference signals: a demodulation reference signal (DMRS) and a sounding reference signal (SRS). The demodulation reference signal (DMRS) may be used for channel estimation in the eNB receiver in order to demodulate control and data channels. The sounding reference signal (SRS) may provide uplink channel quality information as a basis for scheduling decisions in the eNB. Both uplink reference signals may be derived from a Zadoff-Chu sequence group. Reference signals for different UE may be provided by different cyclic shifts of the same root sequence, which may be orthogonal to each other. Consequently, the eNB may reserve typically one sequence group and cyclic shifts of the root sequence that defines a sequence group may be used for UE multiplexing. Accordingly, each UE may be allocated a reference signal as a cyclic shift from the root sequence.

Figure 2:
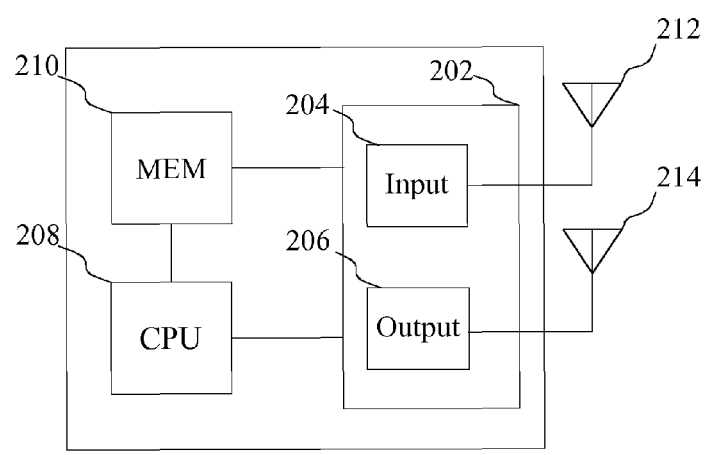
FIG. 2 illustrates an apparatus according to an exemplary embodiment.

The block diagram in FIG. 2 shows a reference hardware configuration of an apparatus 200 according to an exemplary embodiment. The apparatus may be used for communications for example in the communications system of FIG. 1. The apparatus may be for example a wireless node 106 or 108, or an infrastructure node 102 or 104 in FIG. 1. The apparatus 200 in FIG. 2 may comprise a transceiver unit 202 for communicating on a communications channel. The transceiver may comprise a transmitter 206 and a receiver 204 that may be electrically interconnected to a processing unit 208. The transmitter 206 may receive a bit stream from the processing unit 208, and convert it into a radio frequency signal for transmission by the antenna 214. Correspondingly, the radio frequency signals received by the antenna 212 may be led to the receiver 204, which may convert the radio frequency signal into a bitstream that may be forwarded to the processing unit 208 for further processing.

The processing unit 208 is a central element that essentially comprises an arithmetic logic unit, a number of special registers and control circuits. For example, the functions implemented by the processing unit 208 in reception of transmissions typically comprise: channel estimation, equalisation, detection, decoding, reordering, de-interleaving, de-scrambling, channel de-multiplexing, and burst de-formatting. A Memory unit 210, a data medium where computer-readable data or programs or user data can be stored, is connected to the processing unit 208. The memory unit 210 may typically comprise memory units that allow for both reading and writing (RAM) and memory whose contents can only be read (ROM).

The processing unit 208, the memory unit 210, and the transceiver unit 202 may be electrically interconnected to provide means for performing a systematic execution of operations on the received and/or stored data according to the predefined, essentially programmed processes of the apparatus. In solutions according to an exemplary embodiment, the operations comprise functions for correlating a reference signal with a received signal and determining, on the basis of a result of the correlation whether the reference signal can be employed on a communications channel. These operations are described in more detail with FIGS. 3 to 5.

It should be noted that only elements necessary for describing an exemplary embodiment are illustrated in FIG. 2. To a person skilled in the art it is clear that an apparatus for receiving a transmission on a communications channel may comprise a plurality of further elements and functionalities not explicitly illustrated herein. In addition, the blocks illustrate logical or functional units that may be implemented in or with one or more physical units, notwithstanding whether they are illustrated as one or more blocks in FIG. 2.

Figure 3:
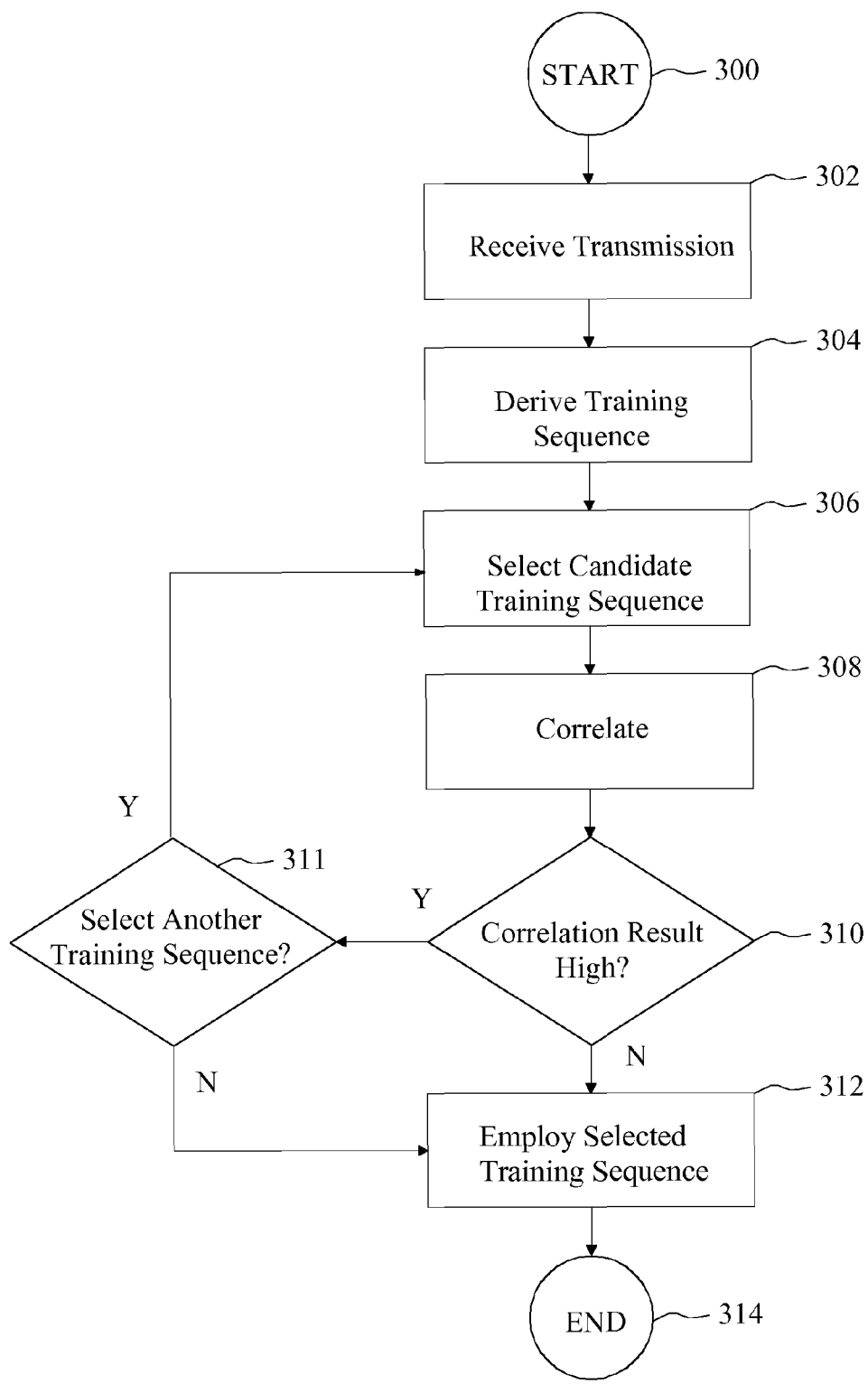
FIG. 3 illustrates a process according to an exemplary embodiment.

FIG. 3 illustrates an exemplary process according to an embodiment where a result of correlating a received transmission with a reference signal is used for determining whether the reference signal may be employed on a communications channel.

In one embodiment according to the process of FIG. 3, the reference signal may be a candidate for a reference signal to be used on a communications channel by UE or a BS. This may happen when the UE or BS is allocated a communications channel, e.g. a frequency band or a time slot, a reference signal to be used on the channel should be determined for example to facilitate channel estimation on the allocated communications channel. Accordingly, the process may be used for searching a candidate reference signal to be used on the communications channel that is allocated.

In one embodiment according to the process of FIG. 3, the candidate reference signal may be a reference signal that is currently being used in transmissions on a communications channel. Where the candidate reference signal is being used, for example by being allocated to UE or a BS, the exemplary process may be used for determining whether the same reference signal, i.e. the candidate reference signal, may be employed on another communications channel. Thus, in the process another communications channel may be selected on the basis of the result of the correlation.

In one embodiment according to the process of FIG. 3, a received transmission may comprise a reference signal, wherein a result of correlating the received reference signal with the candidate reference signal may be used for determining whether the candidate reference signal may be employed on the communications channel.

The process of FIG. 3 may be implemented for example in the apparatus of FIG. 2. In the following, the process is described as executed by a BS of a GSM communications system, however without limiting the example thereto. In the process, the BS may receive transmissions on time slots allocated to one or more UE. The BS may also receive transmissions on time slots that are not allocated, for example on a frequency band not allocated to the BS or on a time slot not allocated to UE. The BS may monitor the non-allocated channels for transmissions. The monitoring may include receiving a transmission on a non-allocated channel. The process starts in 300.

In 302 the BS receives a transmission on a communications channel. The communications channel may be a time slot on the frequency band allocated to the BS. The transmission may be a burst in the time slot, e.g. a Normal Burst in a GSM communications network. The transmission may include a reference signal such as a training sequence. The reception may comprise demodulation from a radio frequency to an intermediate or baseband frequency, for example.

In 304 a training sequence is derived from the received transmission. The received transmission may include one or more fields comprising bits or a structure of bits, where one field may comprise the training sequence. The received bit fields may be de-multiplexed to derive the bit field including the training sequence.

In an embodiment, the training sequence may be located in the middle of the received transmission. Thus, the derivation in 304 may comprise extracting the training sequence from the middle of the transmission. The length of the training sequence may be defined as a number of symbol periods of the modulation scheme used in the transmission. For example, the length may be 26 symbol periods for a Normal Burst. Accordingly, the derivation may comprise extracting the symbol periods of the training sequence from the transmission. It should be appreciated that the training sequence may also be located at the beginning or at the end, or both at the beginning and the end of the transmission.

In 306 a reference signal may be selected as a candidate reference signal to be employed on the communications channel. The reference signal may be a training sequence, for example. The candidate training sequence may be allocated to be used by the BS on the frequency band of the BS.

In an embodiment, in 306 a candidate training sequence to be selected may be determined on the basis of network planning of the training sequences. The network planning comprises information on training sequences or a set of training sequences allocated to one or more BSs in a communications network. Accordingly, in one example a candidate training sequence to be used in a BS may be selected on the basis of the allocated training sequences in the BS. When the planned allocation of training sequences may be followed, interference between training sequences may be kept small. In another example, a candidate training sequence to be used in a BS may be selected on the basis of the allocated training sequences in one ore more nearby, e.g. neighbouring, BSs. Accordingly, the candidate training sequence to be used in a BS may be selected such that it is not allocated to the nearby BSs or that the interference between the candidate training sequence and training sequences of the neighbouring BSs may be kept low. In this way, the candidate training sequence may be selected even if no training sequences are allocated to the BS or all the allocated training sequences are used and training sequences are available.

In an embodiment, a selection of a candidate training sequence in 306 may be optimized on the basis of information from dynamic allocation of communications channels. This information may be obtained e.g. from Dynamic Frequency and Channel Allocation (DFCA), where communications channels may be allocated on the basis of interference and/or usage statistics.

In an embodiment, in 306 a candidate training sequence may be selected from a set of candidate training sequences.

The set of candidate training sequences may be a set allocated to the BS. The selected training sequence may be a cyclically shifted version of a root training sequence defining the set of training sequences.

In 308 the received transmission and the selected training sequence may be correlated. The correlation may be performed at least over a fraction of a training sequence period. Thus the fraction of the training sequence period may include at least a fraction of the symbols in the training sequence. A result of the correlation may indicate correspondence between the received transmission and the selected training sequence. The result may be used for determining whether the selected candidate training sequence would provide a separation from the received transmissions, if the selected candidate training sequence was used on the same communications channel as the received transmission.

In an embodiment, the selected candidate training sequence may be from a set of candidate training sequences, and a result of the correlation in 308 may indicate correspondence between the set of candidate training sequences and the received transmission.

In an embodiment, the received transmission in 302 comprises a training sequence, and the received training sequence may be correlated in 308 with the candidate training sequence. In this way correspondence between the received and selected training sequence may be obtained as a result of the correlation.

In 308, a result of the correlation may be high, thus indicating a good correlation, or low, thus indicating a poor correlation. A high correlation may be indicated when the received transmission and the candidate training sequence are the same. The correlation result may be high for example if the received transmission comprises the candidate training sequence. This may happen if the candidate training sequence is already being used in an adjacent cell or a neighbouring BS. Thus, if the candidate training sequence that has a high correlation result were used, this could result in simultaneous transmissions of the same training sequence and, consequently distortions in the received transmissions. A low correlation may be indicated when a difference exists between the received transmission and the candidate training sequence. The correlation result may be low for example when the received transmission does not include the selected training sequence. Thus, the low correlation result indicates that no simultaneous use exists of the candidate training sequence on the communications channel, and thus the candidate training sequence may be used on the communications channel. A correlation result may be a value between 0 and 1. A value above 0.5, for example 0.8, may be considered to indicate a high correlation. A value around 0.5 or lower may be considered to indicate a low correlation.

In 308, the correlation may be seen as a channel estimation process on the basis of the received transmission. In the channel estimation process, a channel estimate of the communications channel may be calculated on the basis of the received transmission. A good quality channel estimate indicates a high correlation. This may happen when the candidate training sequence is already being used in transmissions on the communications channel, e.g. the received signal in 302 comprises the candidate training sequence. The channel estimation for a candidate training sequence may be performed together with estimating already active channels for example in the receiver by using a joint detection type of a receiver algorithm. The quality of the channel estimate may be measured for example as a signal-to-noise ratio or variance.

A result of the correlation may be evaluated in 310.

In an embodiment, a result of correlating a received transmission with a candidate training sequence may be combined with other indications of simultaneous use of the candidate training sequence on the communications channel, e.g. in other cells or BSs. For example, in addition to using the quality of a channel estimate calculated on the basis of the received transmission comprising the possible interfering training sequence, bits carried in the received transmission may be detected to obtain detection information from the carried bits and use that information on the detected bits in the received transmission together with the result of the correlation to further confirm whether the candidate training sequence is already occupied by another cell. The detection information from the carried bits may comprise a signal level of a detected bit or a sum of signal levels of bits detected from a received transmission. Thus, in an example where the received transmission comprises a Normal Burst in GSM, the bits detected from the Normal Burst may be added and the sum may be evaluated to determine whether the detection of bits has been successful.

Accordingly, it should be appreciated that the other indications of simultaneous use of the candidate training sequence may include but are not limited to for example: information on detected bits in the received transmission, information from decoding the received transmission, energy of the received transmission, signal-to-noise-ratio of the received transmission or signal-to-interference-ratio of the received transmission, correlation of the received signal with the candidate training sequence, quality of the channel estimate calculated on the basis of the received transmission. It should be appreciated that these indications may also be calculated from parts of the received transmission, e.g. from a training sequence derived from the received transmission. In this way, more information may be provided for the evaluation of the result of the correlation in step 310, and the result of the correlation may be evaluated more accurately.

If the result of the correlation in 308 is high, the BS may not employ the selected training sequence in the time slot the transmission was received on, and the process proceeds from 310 to 311.

In 311 it is evaluated whether another training sequence should be selected to be correlated with the received transmission. Since in 311 the correlation performed in 308 indicates a high correlation, a separation of simultaneous transmissions on the communications channel may not be possible by using the selected candidate training sequence in transmissions. Accordingly, another training sequence should be used on the communications channel, and the process proceeds to 306 to select another candidate training sequence. In 306 the new candidate training sequence may be selected from the same set as the previous candidate training sequence. The candidate training sequence may be selected from a different set, for example if no available training sequences exists in the same set as the first selected candidate training sequence.

If in 311 it is determined that no available training sequences or sets of training sequences exists to be used on the communications channel, e.g. because the training sequences are already being used in a neighbouring BS or UE, the process may proceed to 312 to select a new communications channel to be used with the selected candidate training sequence. In this way, communications using the selected candidate training sequence may be possible even when no available training sequences exist.

If in 310 it is determined that the result of the correlation in 308 indicates a low correlation, the result indicates a difference between the received transmission and the selected candidate training sequence. Due to the low correlation, transmissions employing the candidate training sequence and the received training sequence may be separated when used in simultaneous transmissions on the same time slot, and the process may proceed to 312.

In 312 the selected candidate training sequence may be employed on a communications channel. The employment may comprise using the training sequence as included in transmissions on the communications channel so as to provide information on the channel condition of the communications channel to the receiver, e.g. UE or BS. Accordingly, the BS may employ the selected candidate training sequence in transmissions on the time slot of the received transmission in 302. By employing the selected candidate training sequence on the communications channel, simultaneous transmissions may be separated and the performance of the channel estimations by using the selected candidate training sequence may be kept at an acceptable level.

In an embodiment, the selected candidate training sequence may be employed in 312 on a communications channel other than the communications channel of the received transmission, as explained in connection with step 311. In this way, use of the candidate training sequence on the communications channel where a corresponding or similar training sequence is already being used may be avoided. The performance of channel estimations on the basis of the candidate training sequence may thus be ensured.

If in 310 it is determined that the result of the correlation in 308 indicates a low correlation, the selected candidate training sequence may be used in transmissions on the communications channel. Accordingly, the selected candidate training sequence may provide a separation of simultaneous transmissions on the same communications channel, e.g. a time slot and a frequency band. The low correlation may also indicate that the selected candidate training sequence may be used for provide a sufficient channel estimate. Accordingly, the selected candidate training sequence may be used for separate simultaneous transmissions of different UE on the same communications channel, for example in VAMOS. Consequently, the BS may employ the selected candidate training sequence on the same time slot and frequency band in 312.

In 312, the employment may comprise that the BS informs UE of the selected candidate training sequence to be used in communications between the UE and BS. In one example, the informing comprises transmitting a message that informs the UE of the selected candidate training sequence. The message may be transmitted on a Radio Resource layer, for example. In another example, the informing may be performed in connection with a channel assignment to the UE, for example by the BS transmitting a channel assignment message that comprises an indicator of the selected candidate training sequence to the UE. The indicator may be an identifier comprising one or more bits for example. In another example where the time slot of the received transmission in 302 comprises a Common Control Channel (CCCH) between UE and a BS, the informing may comprise the UE determining the selected candidate training sequence to be employed on the communications channel on the basis of the last three bits of the Base Station Identification Code on the CCCH of the BS. When the selected candidate training sequence is employed, the selected candidate training sequence may be used in transmissions on the communications channel by the BS or the UE or both the BS and the UE. When a training sequence is employed on a communications channel in 312, the process ends in 314.

Figure 4:
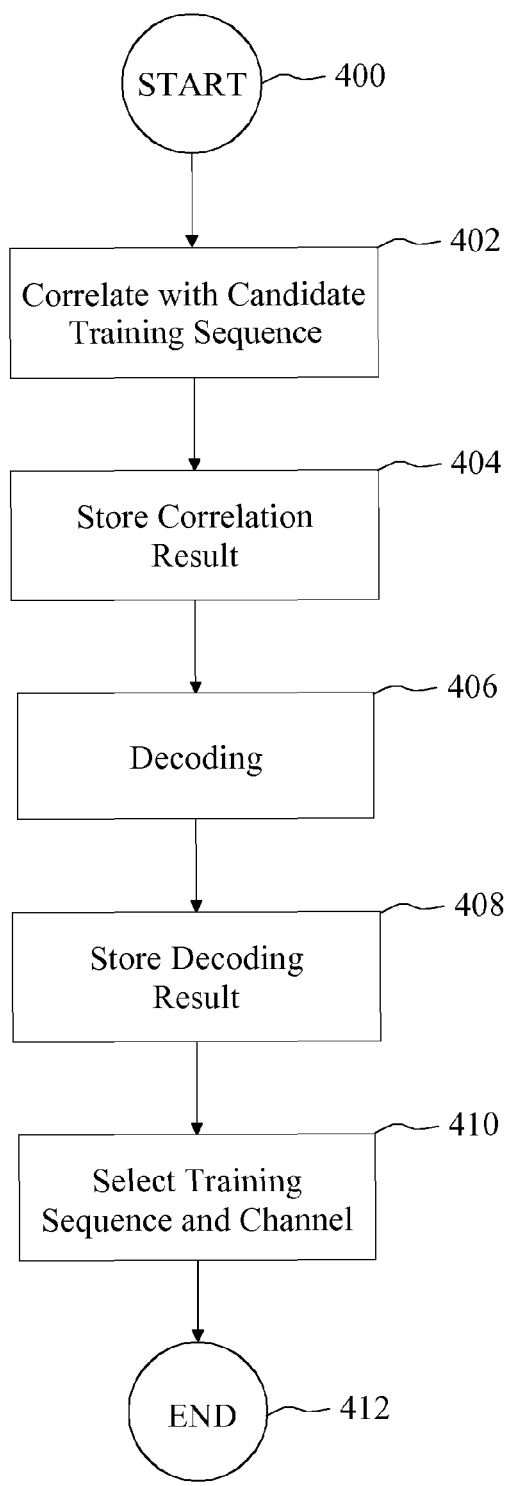
FIG. 4 illustrates a process according to an exemplary embodiment.

FIG. 4 illustrates an exemplary process according to an embodiment where information on employed training sequences on communications channels is collected and correlated with a candidate training sequence to select a training sequence to be employed. Also information from decoding of the received transmission may be used in selecting the training sequence. The process may be implemented in the apparatus of FIG. 2. In the following, the process is described as executed by a BS of a GSM communications system, without however limiting the process thereto. To collect information on employed training sequences and communications channels, the BS may monitor one or more time slots on one or more frequency bands. The monitoring may comprise receiving one or more transmissions that may include a training sequence. The frequency bands may include a frequency band allocated to the BS. The process is started in 400, where a BS has received a transmission that has been processed according to steps 302 to 304 of FIG. 3. Accordingly, the transmission may be received when the BS is monitoring for transmissions. The received transmission and the candidate training sequence are correlated in 402. The correlation may be performed as explained in connection with step 308 in FIG. 3.

In 404, the result of the correlation may be stored in.

Figure 5:
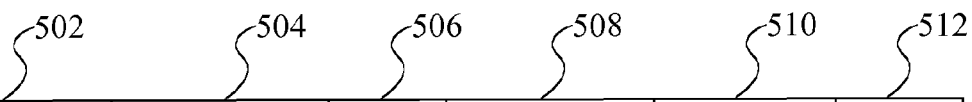
FIG. 5 illustrates a data structure according to an exemplary embodiment.

The stored result may be associated with information indicating the candidate sequence used in the correlation. The stored result may also be associated with information identifying the communications channel on which the received transmission was received. This information may include the frequency band of the received transmission and the time slot the transmission was received in, for example. An example of the stored information is illustrated in FIG. 5.

In 406 of FIG. 4, the received transmission or part of the received transmission may be encoded and the encoded received transmission or part of it may be decoded. The encoding used in the received transmission may be a channel encoding, such as a convolutional code. As a result of the decoding, a decoded received transmission or a decoded part of the received transmission, and information indicating whether if the decoding was a success or a failure may be obtained. This information may be in the form of cyclic redundancy check (CRC) over protected bits, for example. Accordingly, information on decoded bits in the received transmission may be obtained and used for evaluating the result of the correlation in 402.

In 408, the information on the decoding result may be stored in association with the information on the candidate training sequence. The decoding result may be stored as illustrated in FIG. 5, for example.

In an embodiment, steps 402 to 408 may be repeated in the process of FIG. 4 with different candidate training sequences to obtain results of correlations between the different candidate training sequences and the received transmission. In this way, more information may be collected from the used candidate training sequences and associated communications channels.

In 410 a candidate training sequence from among a plurality of candidate training sequences to be employed on a communications channel may be determined on the basis of the correlation results by selecting the candidate training sequence to be employed that has a low correlation result on the communications channel. The low correlation result indicates that the candidate training sequence is not used in transmissions on the communications channel. Thus, the training sequence may provide a separation of transmissions between UE and a BS from other transmissions on the communications channel. If more than one candidate training sequence has a low correlation result, the training sequence with the latest time stamp may be selected, since the result indicates the most recent status of employed candidate sequences in the time slot.

In an embodiment, in 410 a candidate training sequence from among a plurality of candidate training sequences to be employed on a communications channel may be determined on the basis of the correlation and the decoding results associated with each of the candidate training sequences. When the correlation result associated with the candidate training sequence indicates a high correlation and the decoding result indicates an unsuccessful decoding, the candidate training sequence should not be employed on the communications channel, since the high correlation indicates that the candidate training sequence is already being used in the received transmission.

Accordingly, in an example according to the embodiment, a BS may have allocated UE a candidate training sequence to be used in bursts transmitted to the BS. The correlation between the candidate training sequence and the training sequence of the received transmission may be high if the same training sequence is used in a neighbouring BS or UE. The result of the decoding of the received transmission together with the result of the correlation may be used to indicate that the candidate training sequence is already being used in simultaneous transmissions on the communications channel and should be avoided so as to avoid performance degradation, e.g. in channel estimations using the candidate training sequence. Accordingly, another candidate training sequence should be employed in communications between the UE and the BS.

In an embodiment, the process of FIG. 4 may be applied to an example where the communications channel comprises frequencies of a frequency hopping pattern. In the example, correlating a received transmission with a candidate training sequence may be performed on transmissions received from each or some of the frequencies of a frequency hopping pattern. A result of correlating the transmissions received from each frequency of the frequency hopping pattern with a candidate training sequence may be used for determining whether the candidate training sequence may be used together with the frequency hopping pattern. In one example, some of the correlation results of the frequencies of the frequency hopping pattern indicate a high correlation. Then, if the fraction of frequencies of the frequency hopping pattern for which a high correlation have been indicated is low or insignificant in relation to robustness of the error tolerance of the communication channel, the candidate training sequence may be selected to be employed in communications with the frequency hopping pattern. In another example, if all the correlation results for the frequencies of the frequency hopping pattern indicate a low correlation, the candidate training sequence may be used with the frequency hopping pattern. Accordingly, a candidate training sequence to be employed with a frequency hopping pattern may be determined on the basis of correlation results of each candidate training sequence and received transmissions on frequencies of the frequency hopping pattern.

When a candidate training sequence to be employed on a communications channel has been determined, the process ends in 412.

In an embodiment, the processes of FIGS. 3 and 4 may be used for monitoring a communications channel by performing steps 302 to 308 and 402 to 410 periodically on the communications channel. The period may be defined such that the correlation may be performed on all transmissions on the communications channel or only on some of the transmissions, e.g. on every second transmission on the communications channel. For example, where the communications channel is a time slot in a GSM communications network, every time slot, every second time slot or a specific time slot in every or some of the TDMA frames may be monitored to receive a signal and to correlate the received signal with a candidate training sequence. In another example where the communications channel comprises a plurality of frequencies, e.g. a frequency hopping pattern, every frequency, some of the frequencies or randomly selected frequencies of the hopping pattern may be monitored to obtain one or more correlation results for the frequency hopping pattern. By the periodical correlation, training sequences and associated communications channels may be determined. Thereby, the use of the candidate training sequence on a communications channel already employing the same training sequence may be avoided. This may be beneficial when no existing information is provided about which training sequence should be used on the communications channel.

In the embodiment of performing the correlation periodically on the selected communications channel, the results may be stored in a data structure in association with the communications channel in the data structure, e.g. in association with the frequency band indicated in column 504 in FIG. 5. Time stamps may be associated with each of the periodical results as in FIG. 5, column 512. Accordingly, a candidate training sequence to be used on the communications channel may be determined on the basis of correlation results obtained for the communications channel at a plurality of periods. The time period of performing the correlation on the communications channel may be selected as is suitable according to the purpose and operation environment, such as the specifics of the communications technology used and the traffic pattern of the communications network. The time period may be one hour, a day, a week, for example. In this way, the combination of a training sequence and a communications channel may be adapted to a traffic situation of a communications network that may vary in time.

It should be appreciated that although the embodiments in the processes described in FIGS. 3 and 4 have been explained for the purpose of determining a training sequence to be employed, in an embodiment the correlation results obtained in steps 308 in FIG. 3 and 402 in FIG. 4 may also be used for select a communications channel, e.g. a time slot or a frequency hopping pattern, such that the correlation result is low. According to this embodiment, in step 410 of FIG. 4, a communications channel may be selected on the basis of the correlation result indicating a low correlation with a candidate training sequence. In this way, a training sequence allocated to a BS or UE does not have to be changed, but the communications channel may be changed to a communications channel where no colliding training sequences have been observed. This may be used for example in deploying BSs in a network. A BS according to the embodiment may have a training sequence preconfigured and the frequency band of the BS may be changed on the basis of the correlation result. Thus, BSs may be deployed without their frequency band of operation.

In an embodiment where a communications channel comprises frequencies of a frequency hopping pattern, correlation of a candidate training sequence with transmissions received on each or some of the frequencies of the frequency hopping pattern may be performed on a plurality of frequency hopping patterns. In this way, for each frequency hopping pattern a fraction of frequencies may be determined that have a low correlation result. Thus, the frequency hopping pattern with the highest fraction of frequencies with a low correlation result may be selected as the frequency hopping pattern to be used with a candidate training sequence. Consequently, the frequency hopping pattern that has the least frequencies where the candidate training sequence may already be used and that has the most frequencies where the candidate training sequence may be successfully used, for example in a UE or BS may be selected.

It should also be appreciated that the correlation result obtained in 308 in FIG. 3 and 402 in FIG. 4 may be used for adjusting timing of transmissions of the simultaneously transmitting UE. For example, the timing of time slots may be changed. In GSM, the BS resources are divided in time into eight time slots, each having a length of 577 microseconds, per Time Division Multiple Access (TDMA) frame having a length of 4.615 ms. Accordingly, the BS may adjust the TDMA frame timing, for example by the duration of a single time slot in order to avoid transmissions in the same time slot. Consequently, the embodiment provides for adjusting the timing of transmissions on the basis of a correlation result indicating a high correlation.

FIG. 5 illustrates a data structure 500 storing information on candidate training sequences that have been correlated with a received transmission, for example as in processes 3 and 4. The data structure may be stored in a memory of an apparatus according to FIG. 2. The contents of the data structure in FIG. 5 are illustrated using the terminology known from GSM networks without however limiting thereto. The different types of information in the data structure may be arranged in columns, where each row includes information associated with a candidate sequence. The arrangement of FIG. 5 is illustrative and a skilled person understands that the elements in the data structure may be arranged and associated with each other also in other ways.

Column 502 comprises candidate training sequences in rows, each of which stores information on a candidate training sequence. The information on each candidate training sequence may include information that allows the candidate sequence to be identified. This information may comprise for example the candidate sequence or an identifier of the candidate sequence.

Columns 504 and 506 comprise identifiers of communications channels in rows, each column 504 and 506 comprising an identifier of a communications channel associated with the candidate sequence in the same row. The candidate sequence may be employed on the identified communications channel. In the context of GSM, for example, the communications channel may be identified by the frequency band that is associated with the candidate training sequence and stored in column 504. The frequency band may be identified in the data structure by a numeral, for example. The communications channel may further be identified in column 506 by a time slot that is associated with the frequency band. The time slot may be identified for example by a numeral from 0 to 7, defining eight time slots in GSM. It should be appreciated that although two columns are used herein to store information on the communications channel, any other number of columns could be used. For example, only one column, e.g. indicating the time slot, could be sufficient.

Column 508 comprises correlation results in rows, each of which stores a correlation result associated with the candidate training sequence in the same row and obtained for example in process step 308 in FIG. 3 or process step 402 in FIG. 4. A high correlation result may be identified by a '+' sign and a low correlation result by a '−' sign, for example.

Column 510 comprises decoding results in rows, each of which stores a decoding result associated with the candidate training sequence in the same row and obtained for example in process step 406 in FIG. 4. The decoding result may be identified for example by 'success' or 'fail', indicating a successful and an unsuccessful decoding result, respectively.

Column 512 includes time stamps in rows, each of which stores a time value associated with the correlation result stored in column 508 in the same row. The format of the time values may be expressed in a format such as 'hours':'minutes'.

It should be appreciated that the processes described in FIGS. 3 and 4 may be implemented in communications systems also other than GSM. For example, in LTE the processes of FIG. 3 and FIG. 4 may include detecting from several Fast Fourier Transform (FFT) blocks of a received transmission and correlating the received blocks with a candidate training sequence/pilot to obtain a correlation result. This correlation result may be used in a manner similar to the correlation results explained in connection with processes illustrated in FIGS. 3 and 4.

The steps/points, transmissions and related functions described above in FIGS. 3 to 4 are in no absolute chronological order, and some of the steps/points may be performed simultaneously or in an order differing from the given one. Other functions can also be executed between the steps/points or within the steps/points and other transmissions sent between the illustrated transmissions. Some of the steps/points or part of the steps/points can also be left out or replaced by a corresponding step/point or part of the step/point. In addition, the transmissions may also contain other information.

The storage circuitry 210 in FIG. 2 may be configured to store programming, such as executable code or instructions (e.g. software or firmware), electronic data, databases, or other digital information, and may include processor-usable media. Such processor-usable media may be embodied in any computer program product or article of manufacture which can contain, store, or maintain programming, data or digital information for use by or in connection with an instruction execution system including a processing circuitry 208 in the exemplary embodiment. For example, exemplary processor-usable media may include any one of physical media, such as electronic, magnetic, optical, electromagnetic, infrared or semiconductor media. Further specific examples of processor-usable media include, but are not limited to, a portable magnetic computer diskette, such as a floppy diskette, zip disk, hard drive, random-access memory, read only memory, flash memory, cache memory, or other configurations capable of storing programming, data, or other digital information.

At least some embodiments or aspects described herein may be implemented using programming stored within an appropriate storage circuitry 210 described above or communicated via a network or other transmission media and configured to control the appropriate processing circuitry 208. For example, programming may be provided via appropriate media including, for example, embodied within articles of manufacture, embodied within a data signal (e.g. modulated carrier wave, data packets, digital representations, etc.) communicated via an appropriate transmission medium, such as a communication network (e.g. the Internet or a private network), wired electrical connection, optical connection or electromagnetic energy, for example, via a communications interface 212, 214, or provided using another appropriate communication structure or medium. Exemplary programming including processor-usable code may be communicated as a data signal embodied in a carrier wave in but one example.

It will be obvious to a person skilled in the art that, as the technology advances, the inventive concept can be implemented in various ways. The invention and its embodiments are not limited to the examples described above but may vary within the scope of the claims.

The invention claimed is:

1. A method comprising:
    receiving a signal on a communications channel, wherein the received signal comprises one or more transmissions to be received, one or more interfering transmissions, and background noise, wherein the one or more transmissions or a part of the one or more transmissions to be received comprises an encoded transmission which is able to be decoded;
    decoding the encoded transmission;
    correlating the received signal and a first reference signal, wherein the correlation results in finding a level of correspondence between the received signal and the first reference signal, wherein the decoding results in obtaining information on the decoded received transmission to use for evaluating the results of the correlation; and
    determining, on the basis of the results of the decoding and the results of the correlation,
        whether the first reference signal can be employed on the communications channel, and
        whether the received signals on the communications channel are transmissions between a user equipment and a base stations.

2. The method of claim 1, wherein the received signal comprises a second reference signal and wherein the method further comprises:
    correlating the second reference signal with the first reference signal, and
    determining whether the first reference signal can be employed on the communications channel on the basis of a result of the correlation.

3. The method of claim 2, wherein the first reference signal is from a first set of reference signals, and the method further comprises:
    selecting a second reference signal from the first set of reference signals if the result of the correlation is high, and determining whether the second reference signal from the first set of reference signals can be employed on the communications channel.

4. The method of claim 1, further comprising:
    selecting another communications channel, and using the first reference signal in transmissions on the other communications channel if the correlation is high.

5. The method of claim 4, further comprising determining whether the first reference signal can be employed on the communications channel on the basis of a fraction of a plurality of correlations between the received signal and the first reference signal.

6. The method of claim 2, wherein the first reference signal is from a first set of reference signals and the received signal comprises a second reference signal, and the second reference signal is from a second set of reference signals.

7. The method of claim 1, wherein the first reference signal is from a first set of reference signals defined by cyclical shifts of a root reference signal.

8. An apparatus comprising:
    at least one processor and at least one memory including computer program code, wherein the at least one memory and the computer code are configured, with the at least one processor, to cause the apparatus to at least perform or control the following:
    receiving a signal on a communications channel, wherein the received signal comprises one or more transmissions to be received, one or more interfering transmissions, and background noise, wherein the one or more transmissions or a part of the one or more transmissions to be received comprises an encoded transmission which is able to be decoded;

decoding the encoded transmission;

correlating the received signal and a first reference signal, wherein the correlation results in finding a level of correspondence between the received signal and the first reference signal, wherein the decoding results in obtaining information on the decoded received transmission to use for evaluating the results of the correlation; and determining, on the basis of the results of the decoding and the results of the correlation, whether the first reference signal can be employed on the communications channel, and whether the received signals on the communications channel are transmissions between a user equipment and a base stations.

9. The Apparatus of claim 8, wherein the received signal comprises a second reference signal, and wherein the at least one memory and the computer code are further configured, with the at least one processor, to cause the apparatus to at least perform or control the following:

correlating the second reference signal with the first reference signal, and determining whether the first reference signal can be employed on the communications channel on the basis of a result of the correlation.

10. The Apparatus of claim 9, wherein the first reference signal is from a first set of reference signals, and wherein the at least one memory and the computer code are further configured, with the at least one processor, to cause the apparatus to at least perform or control the following:

selecting a second reference signal from the first set of reference signals if the result of the correlation is high, and determining whether the second reference signal from the first set of reference signals can be employed on the communications channel.

11. The Apparatus of claim 8, wherein the at least one memory and the computer code are further configured, with the at least one processor, to cause the apparatus to at least perform or control the following:

selecting another communications channel, and using the first reference signal in transmissions on the other communications channel if the correlation is high.

12. The Apparatus of claim 11, wherein the at least one memory and the computer code are further configured, with the at least one processor, to cause the apparatus to at least perform or control the following:

determining whether the first reference signal can be employed on the communications channel on the basis of a fraction of a plurality of correlations between the received signal and the first reference signal.

13. The Apparatus of claim 9, wherein the first reference signal is from a first set of reference signals and the received signal comprises a second reference signal, and the second reference signal is from a second set of reference signals.

14. The Apparatus of claim 8, wherein the first reference signal is from a first set of reference signals defined by cyclical shifts of a root reference signal.

15. A computer program product embodied on a non-transitory computer-readable medium in which a computer program is stored that, when being executed by a computer, is configured to provide instructions to control or carry out:

receiving a signal on a communications channel, wherein the received signal comprises one or more transmissions to be received, one or more interfering transmissions, and background noise, wherein the one or more transmissions or a part of the one or more transmissions to be received comprises an encoded transmission which is able to be decoded;

decoding the encoded transmission;

correlating the received signal and a first reference signal, wherein the correlation results in finding a level of correspondence between the received signal and the first reference signal, wherein the decoding results in obtaining information on the decoded received transmission to use for evaluating the results of the correlation; and determining, on the basis of the results of the decoding and the results of the correlation, whether the first reference signal can be employed on the communications channel, and whether the received signals on the communications channel are transmissions between a user equipment and a base stations.

* * * * *